(12) United States Patent
Onodera et al.

(10) Patent No.: US 6,966,179 B2
(45) Date of Patent: Nov. 22, 2005

(54) EXHAUST GAS PURIFYING SYSTEM

(75) Inventors: Takao Onodera, Fujisawa (JP);
Hidetaka Shibata, Fujisawa (JP);
Takashi Haseyama, Fujisawa (JP);
Takeshi Igarashi, Fujisawa (JP);
Takuro Iwashita, Fujisawa (JP);
Masashi Gabe, Fujisawa (JP);
Yoshihisa Tashiro, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/928,699

(22) Filed: Aug. 30, 2004

(65) Prior Publication Data
US 2005/0044845 A1 Mar. 3, 2005

(30) Foreign Application Priority Data
Sep. 3, 2003 (JP) .............................. 2003-311646

(51) Int. Cl.[7] .............................................. F01N 3/00
(52) U.S. Cl. ..................... 60/295; 60/274; 60/2; 60/29; 60/311; 60/324; 60/297
(58) Field of Search .......................... 60/285, 292, 295, 60/297, 311, 274, 286, 324

(56) References Cited

U.S. PATENT DOCUMENTS 5,845,486 A * 12/1998 Yamashita et al. ............ 60/274
6,041,591 A * 3/2000 Kaneko et al. ................ 60/274
6,055,807 A * 5/2000 Schatz et al. .................. 60/274
6,381,952 B1 * 5/2002 Asanuma et al. .............. 60/284
6,711,892 B2 * 3/2004 Tamura et al. ................ 60/277
6,758,037 B2 * 7/2004 Terada et al. .................. 60/295

FOREIGN PATENT DOCUMENTS

JP          63-201309       8/1988
JP          4-81513         3/1992

* cited by examiner

Primary Examiner—Thomas Denion
Assistant Examiner—Diem Tran
(74) Attorney, Agent, or Firm—Staas & Halsey LLP

(57) ABSTRACT

To provide an exhaust gas purifying system capable of forcibly regenerating DPF by efficiently raising the temperature of exhaust gas even when an exhaust gas temperature is very low at the time of low load and low engine speed such as an idling operation. In an exhaust purifying system (1) having an exhaust throttling valve (31) and a DPF (3) in an exhaust passage and having regeneration control means (P1) for regenerating the DPF (3), the regeneration control means (P1) is provided with an exhaust gas temperature detection means (P22), a fuel injection control means (P11), and an exhaust throttling control means (P12) and includes regeneration control for performing the exhaust gas temperature raising control through the multistage delay injection by the fuel injection control means (P11) and through the exhaust throttling of the exhaust throttling valve (31).

4 Claims, 8 Drawing Sheets

EXHAUST GAS PURIFYING SYSTEM

BACKGROUND OF THE INVENTION

The present invention relates to an exhaust gas purifying system for purifying the exhaust gas of an engine by providing a diesel particulate filter.

The restriction of the discharge quantity of particulate matter (hereafter referred to as PM) to be discharged from a diesel engine has been enhanced year by year together with NOx, CO, and HC. Only an improvement of an engine cannot respond to the enhancement of the legal restriction. Therefore, a technique is developed, which reduces the quantity of the PM to be discharged to the open air by collecting the quantity of the PM using a filter referred to as diesel particulate filter (hereafter referred to as DPF).

The DPF for directly collecting the PM includes a monolith honeycomb wall flow type filter made of ceramic and a fiber-type filter obtained by processing ceramic or metal into fiber. The exhaust gas purifying system provided with the above PDF is set in the middle of the exhaust passage of an engine to purify the exhaust gas generated by the engine, similar to other exhaust gas purifying systems.

The DPF has problems, that is, fuel consumption deteriorates because the exhaust pressure is raised proportionally to the collected quantity of the PM and that a melting loss occurs due to sudden combustion after excessive collection of the PM. Therefore, it is necessary to remove the collected the PM by burning it and regenerate a DPF. As DPF regenerating methods, an electric heater heating type, a burner heating type, and a back washing type are proposed.

However, when using any one of these above mentioned regenerating method, fuel consumption deteriorates because the PM is burned by receiving energy from the outside. Moreover, problems occur since the control for regeneration is difficult and the system becomes large and complex, and may require two DPF systems for alternately performing the PM collection and the PM combustion (DPF regeneration) are necessary.

To solve the above problems, a technique for regenerating a DPF without receiving energy from the outside is proposed. This technique oxidizes the PM with the exhaust heat from the engine to regenerate the DPF by using lower oxidation temperature of the PM using an oxidation catalyst. This DPF system is called a continuously regenerating type DPF system because the regeneration of the DPF is basically continuous. Moreover, theses systems are further-simplified into a single DPF system, which has the advantage of simplifying the regeneration control.

The $NO_2$ generation type DPF system 1X is shown in FIG. 7 as an example of a system for oxidizing the PM by $NO_2$ (nitrogen dioxide) to regenerate a DPF. In this system, an oxidation catalyst 3Aa is set to the upstream side of the common wall flow filter 3Ab. This oxidation catalyst 3Aa oxidizes NO (nitrogen monoxide) in the exhaust gas. Therefore, most NOx in the exhaust gas becomes $NO_2$ in the downstream side of the oxidation catalyst 3Aa. By using the above $NO_2$, the PM collected in the filter 3Ab in the downstream side is removed by oxidizing it into $CO_2$ (carbon dioxide). The $NO_2$ lowers the PM oxidizing temperature (DPF regenerating temperature) because it has a smaller energy barrier than that of $O_2$. Therefore, the PM combustion continuously occurs through the heat energy in the exhaust gas without using the energy supplied from the outside.

In FIG. 7, E denotes a diesel engine, 2 denotes an exhaust passage, 4 denotes a fuel pump system, 5 denotes an electronic control box, 7 denotes a battery, 8 denotes a muffler, and 9 denotes a fuel tank, by reference symbols and reference numbers.

FIG. 8 shows a system 1Y obtained by improving the $NO_2$ regenerating type DPF system in FIG. 7. In this improved system 1Y, a porous catalyst coat layer 31 of an oxidation catalyst 32A is applied to a porous wall surface 30 of a wall flow filter 3B. The system 1Y is set up so as to perform oxidation of NO and oxidation of the PM by $NO_2$ generated by the oxidation of NO on the wall surface of the wall flow filter 3B. This configuration simplifies the system.

Further, FIG. 9 shows a continuous regeneration system 1Z. In this system, a porous catalyst coat layer 31 that comprises the oxidation catalyst 32A and a PM oxidation catalyst 32B such as oxide is applied to the porous wall surface 30 of a wall flow filter 3C. The porous catalyst coat layer 31 burns the PM accumulated in the filter 3C at a low temperature.

The DPF system with these catalysts realizes the continuous regeneration of the PM by using the oxidation reaction of the PM by catalysts and $NO_2$, and thereby lowering the oxidation initiation exhaust gas temperature of the PM, compared to that of a common filter.

In these continuously regenerating type DPF systems, the temperature of the DPF is equal to the combustion temperature of the PM or higher when the exhaust gas temperature is approx. 350° C. or higher, thereby burning and removing the PM collected in the DPF and realizing the self-regeneration of the DPF. However, even if the DPF is constituted by the continuously regenerating type DPF system to lower the oxidation initiation exhaust gas temperature of the PM, the exhaust gas temperature of approx. 350° C. is still needed. Therefore, the oxidation pf the PM and the self-regeneration of the DPF do not occur when the exhaust gas temperature is lower than approx. 350° C., due to a low load operation, an idling operation, and the like.

Therefore, when the engine operation states at a low exhaust gas temperature such as the idling, the low load and the like are continued, a PM oxidation state is not realized even if the PM is accumulated, causing the increase in the exhaust pressure and the deterioration of the fuel consumption. Further, there is a risk of abnormal combustion of the DPF, due to the excessive collection.

Therefore, in these continuously regenerating type DPF systems, a necessary condition for the DPF regeneration is set by calculating the accumulated quantity of the PM in a filter in accordance with an engine operation condition and/or estimating the accumulated quantity of the PM in accordance with the pressure loss of the filter that corresponds to the accumulated quantity of the PM. Then, the DPF regeneration control, which forcibly raises the exhaust gas temperature and burns the accumulated PM for removal, is performed when the necessary condition for the DPF regeneration is satisfied.

For the above DPF regeneration control, Japanese Patent Laid-Open No. 1988-201309 discloses one of the methods for raising an exhaust gas temperature by throttling exhaust gas together with the use of an EGR valve. Moreover, Japanese Patent Laid-Open No. 1992-81513 discloses a method for controlling the valve opening of an exhaust throttling valve that is set to the downstream side of a trap filter (DPF) so as to keep an exhaust gas temperature in a predetermined regeneration temperature range while regenerating the filter.

These DPF regeneration controls are effective when an exhaust gas temperature that occupies a large portion of an engine operation region ranges between 200° C. and 350° C.

However, there is a problem that a DPF cannot be forcibly regenerated in a region with the extremely low exhaust gas temperature because it is difficult to raise an exhaust gas temperature up to a temperature necessary for regeneration, even when the DPF regeneration control is performed by the common post injection and the like. The low exhaust gas temperature means the condition with the exhaust gas temperature of approx. 200° C. or lower, such as when an engine is operated at low load and low engine speed for idling and the like.

An $NO_2$ regeneration type DPF system with an oxidation catalyst set to the upstream side has the following problems. When an exhaust gas temperature rises after a state in which the DPF cannot forcibly be regenerated is continued, the fuel accumulated in an oxidation catalyst is suddenly burned. Therefore, the temperature of the oxidation catalyst becomes high, causing deterioration of the catalyst and a melting loss. Moreover, the exhaust gas, the temperature of which is high due to this sudden combustion, flows into the DPF at the downstream side. Thereby, the PM accumulated in the DPF is suddenly burned, and the melting loss of the DPF occurs.

Moreover, the following problems occur when raising the temperature of exhaust gas by combining the exhaust throttling and the EGR of the former method disclosed in Japanese Patent Laid-Open No. 1988-201309. A period for raising an exhaust pressure becomes longer because the exhaust throttling is performed to raise an exhaust gas temperature in every forcible regeneration, thereby causing deterioration of the fuel consumption. Moreover, it the forcible regeneration of the latter method disclosed in Japanese Patent Laid-Open No. 1993-81513, a region for performing the exhaust throttling, that is, a region in which a valve is closed, is very wide, and a period for raising an exhaust pressure becomes longer, just like in the case of the former method, when performing an exhaust throttling control to realize a predetermined temperature range, thereby causing the deterioration of the fuel consumption.

Further, there is a problem that a high-temperature large-flow-rate exhaust gas, discharged at the time of an idling operation and the like, is not preferable for the surrounding environment.

BRIEF SUMMARY OF THE INVENTION

The present invention is offered to solve the above problems, and its object is to provide an exhaust gas purifying system capable of efficiently raising the temperature of the exhaust gas and performing forcible regeneration of the PM even in a temperature region in which the exhaust gas temperature is extremely low at a low load and a low engine speed for idling operation and the like in the DPF. Moreover, another object of the present invention is to provide the exhaust gas purifying system capable of lowering a tail-pipe outlet temperature by reducing the quantity of the exhaust gas and reducing thermal effects.

In the above exhaust gas purifying system, the exhaust pressure of an engine is raised to increase the quantity of the residual exhaust gas in an intake stroke and raise the temperature thereof, by performing the exhaust throttling together with the multistage delay injection. Thereby, the temperature of the exhaust gas is raised while improving the ignitability and combustion performance of an injection fuel.

An exhaust gas purifying system for achieving the above object has an exhaust throttling valve and a diesel particulate filter (DPF) that are set in an exhaust passage as well as regeneration control means for regenerating the DPF: wherein the regeneration control means is provided with an exhaust gas temperature detection means, a fuel injection control means, and an exhaust throttling control means, and the regeneration control is included, which performs the exhaust gas temperature raising control through the multistage delay injection by using the fuel injection control means and through the exhaust throttling of the exhaust throttling valve by using the exhaust throttling control means, when regenerating the DPF.

The exhaust throttling valve is allowed to be set either in the upstream side or downstream side of the DPF. Moreover, the multistage delay injection is a fuel injection capable of delaying an excessive main injection period, by delaying an injection period and performing a multistage pilot-injection, in which an injection quantity is small, before the main injection, in an electronic control type fuel injection system such as common-rail.

According to the above configuration, the exhaust throttling is performed in parallel when raising the temperature of the exhaust gas through the multistage delay injection that comprises the delay injection and the post injection, in the forcible burning of the PM accumulated in the DPF and the regeneration of the DPF. This exhaust throttling makes it possible to excessively delay the misfire limit of the injection period that is initially performed and increase the injection quantity. Then, a large flame in the early development is formed, the subsequent flame propagation force is improved, and even lean mixture is completely burned. Thereby, occurrence of white smoke and misfire are prevented, and an exhaust gas temperature is efficiently and greatly raised.

As a result, the forcible combustion of the PM can be performed without occurrence of extreme white smoke and with a small quantity of fuel needed for temperature rise, even under the engine operation condition in a low exhaust gas temperature region of a low load or low engine speed such as idling operation and the like, in which the forcible combustion of the PM could not be performed in the past, due to the low exhaust gas temperature. Therefore, a DPF can be regenerated at any time.

That is, when an exhaust gas temperature is in a very low temperature region such as idling operation, the exhaust gas temperature is raised by performing the exhaust throttling and thereby stabilizing delay injection and applying a load to an engine. By circulating the exhaust gas with the high exhaust gas temperature in the engine and improving combustion, it is possible to raise the exhaust gas temperature and forcibly regenerate the DPF. This enables the PM accumulated in the DPF to be efficiently burned and removed at a small fuel consumption, under every engine operation state including an operation region of a low load and a low engine speed such as an idling operation.

Therefore, it is possible to restrain an exhaust pressure rise that is caused by the clog of a DPF due to the accumulation of the PM by regenerating the DPF. Moreover, it is possible to eliminate a trouble such as an engine stall due to a high exhaust pressure, and to improve the fuel consumption. Furthermore, it is possible to prevent a DPF melting loss accident caused by the runaway combustion of the excessively accumulated PM, which is caused by the incapability of the DPF regeneration. Furthermore, it is possible to lower the tail pipe outlet temperature of the exhaust gas because the quantity thereof can be reduced by the exhaust throttling. Therefore, it is possible to correspond to a thermal harm at the time of forcible regeneration.

The above exhaust gas purifying system is constituted so as to perform the exhaust gas temperature raising control through the multistage delay injection by using the fuel injection control means and through the exhaust throttling of the exhaust throttling valve by using the exhaust throttling control means in the DPF regeneration when it is detected by the exhaust gas temperature detection means that an exhaust gas temperature is in a predetermined first temperature region. It is also constituted to perform the exhaust gas temperature raising control through the multistage delay injection by using the fuel injection control means, without performing the exhaust throttling when it is detected by the exhaust gas temperature detection means that the exhaust gas temperature is in a predetermined second temperature region, the temperature of which is higher than that of the first temperature region.

According to the above configuration, the multistage delay injection is performed together with the exhaust throttling only when the forcible regeneration of the DPF is needed and the exhaust gas temperature under the engine operation states, such as idling operation and low load operation, is in the extremely low predetermined first temperature region. Therefore, fuel consumption is significantly reduced, compared to the system that performs the exhaust throttling in every forcible regeneration of the DPF, because the exhaust gas temperature is raised by the multistage delay injection without performing the exhaust throttling in the second temperature region.

In the first temperature region, when the combustion injection is excessively delayed only by the multistage delay injection through the fuel injection control to greatly raise the exhaust gas temperature from a very low temperature, most fuel is burned in an expansion stroke in which the pressure inside a cylinder is extremely low. This causes the following problems: the white smoke is produced in large quantity, and the exhaust gas temperature cannot be efficiently raised. However, the above configuration can avoid these problems by using the exhaust throttling together.

Moreover, the exhaust gas purifying system is constituted so that the exhaust gas temperature detection means detects whether or not the exhaust gas temperature is in a predetermined temperature region by referring to the preset map data thereof, which is divided in advance by relative to the engine speed and the load based on an engine speed and a load.

According to the above configuration, it is possible to detect the exhaust gas temperature from detection values of an engine speed sensor and a load sensor used to control an engine, without newly setting an exhaust gas temperature sensor. Therefore, the manufacturing man-hour and the cost can be saved due to the decrease in the inputs/outputs of the control and the number of components.

Moreover, the above exhaust gas purifying system is constituted so as to fix the throttling value of the exhaust throttling valve when the operation region of the engine is in an idling state, and to perform the exhaust gas temperature raising control by making the throttling value of the exhaust throttling valve variable when the operation region of the engine is not in the idling state, in the regeneration control for performing the exhaust gas temperature raising control through the multistage delay injection by using the fuel injection control means and through the exhaust throttling of the exhaust throttling valve by using the exhaust throttling control means.

Thereby, when the engine performs the idling operation, it is possible to significantly raise the exhaust gas temperature by fixing the throttling value of the exhaust throttling valve and minimizing the quantity of the exhaust gas. In addition, the temperature rise at the DPF position, while reducing the quantity of the exhaust gas, enables to lower the tail pipe outlet temperature. Thereby, it is possible to decrease the thermal influence on the surrounding environment while a vehicle is stopped. Moreover, in the low load operation after starting traveling, it is possible to decrease the exhaust throttling quantity of the exhaust throttling valve and increase the engine output needed for traveling.

The DPF includes a DPF that only comprises a filter but that is not the continuously regenerating type, a continuously regenerating type DPF that comprises a filter with an oxidation catalyst, a continuously regenerating type DPF having an oxidation catalyst at the upstream side of a filter, and a continuously regenerating type DPF that comprises a filter with a catalyst and has a oxidation catalyst at the upstream side of the filter.

As described above, according to the exhaust gas purifying system of the present invention, it is possible to obtain the following advantages for the exhaust gas temperature raising control for regenerating a DPF.

It is possible to raise the exhaust pressure of an engine, increase the quantity of the residual exhaust gas in an intake stroke, and raise the exhaust gas temperature because the exhaust gas temperature is raised by using the multistage injection and the exhaust throttling together. Therefore, it is possible to improve the ignitability and combustion performance of injection fuel, realizing the efficient and significant rise in the temperature of exhaust gas.

As a result, it is possible to regenerate a DPF without generation of extreme white smoke and with a small quantity of fuel needed for temperature rise, even under the engine operation condition in a low load and low engine speed region, such as idling operation, in which the forcible combustion of the PM and the DPF regeneration could not be performed in the past due to the low exhaust gas temperature.

Furthermore, when the exhaust gas temperature under an operation state of an engine is not equal to the very-low predetermined first temperature or lower when forcible regeneration of a DPF is needed, the temperature of exhaust gas is raised by the multistage delay injection without performing the exhaust throttling. Only when the exhaust gas temperature is equal to or the predetermined first temperature or lower, the multistage delay injection is performed together with the exhaust throttling. This configuration results in the significant decrease of fuel consumption, compared to the system for performing the exhaust throttling in every forcible regeneration of a DPF. Moreover, it is possible to efficiently burn and remove the PM deposited in the DPF at a small fuel consumption.

Moreover, it is possible to burn the PM and regenerate the DPF at any time. Therefore, the defects such as faulty traveling due to a high exhaust pressure and the like can be prevented because the exhaust pressure that is caused by a clog of a DPF can be restrained from rising. In addition, the fuel consumption can be improved.

Furthermore, because high-concentration HC does not exist in exhaust gas from a state in which the exhaust gas temperature is equal to or the active temperature of an oxidation catalyst or lower, the HC accumulated on the oxidation catalyst is not suddenly burned. Therefore, it is possible to prevent deterioration and melting loss of a catalyst caused by the high temperature. Moreover, in addition to the oxidation catalyst, it is possible to avoid a filter melting loss due to runaway combustion of the PM in a PDF in the downstream side.

DETAILED DESCRIPTION OF THE INVENTION

An exhaust gas purifying system of an embodiment of the present invention is described below by referring to the appended drawings. In this case, an exhaust gas purifying system with a continuously regenerating type DPF (diesel particulate filter) that comprises of the combination of an oxidation catalyst (DOC) and a catalyst-provided filter (CSF) is described.

Figure 1:
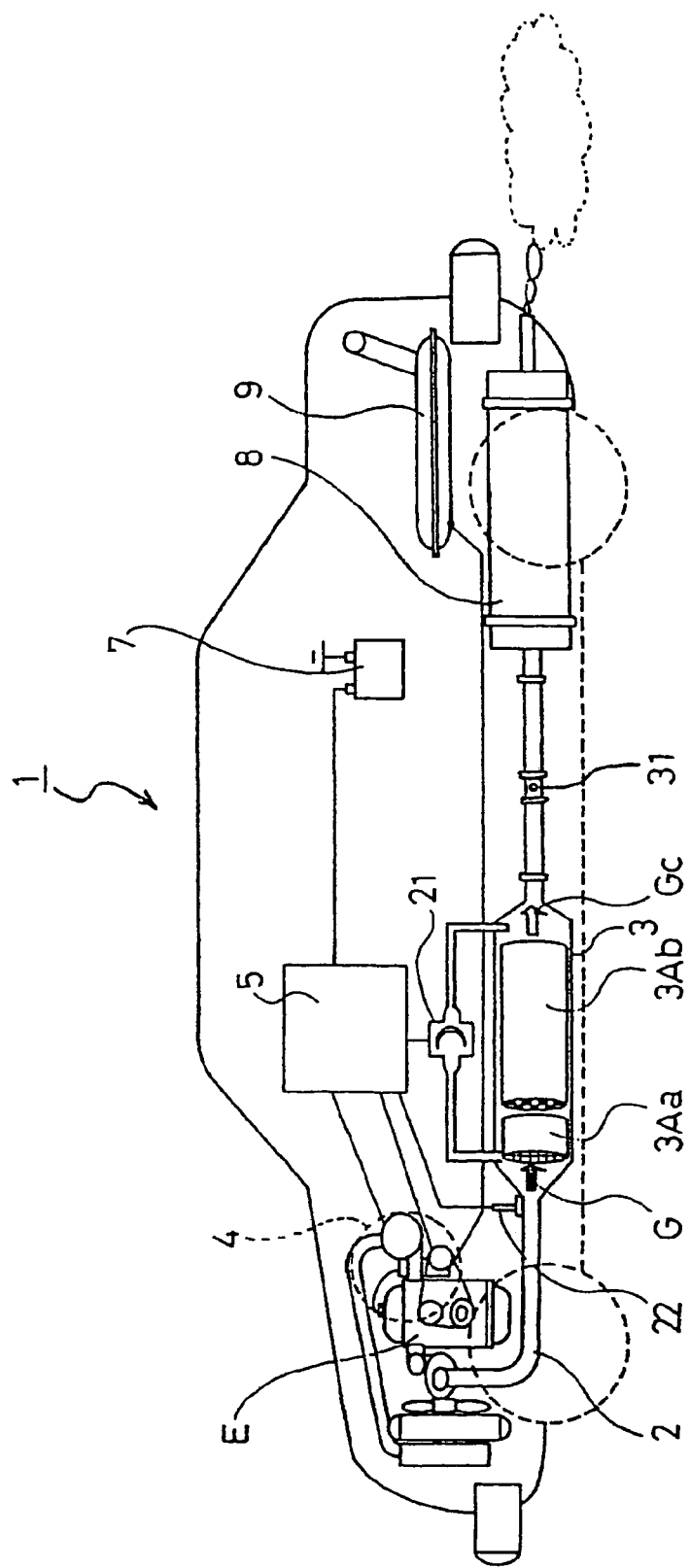
FIG. 1 is a block diagram of an exhaust gas purifying system of an embodiment of the present invention.
Figure 2:
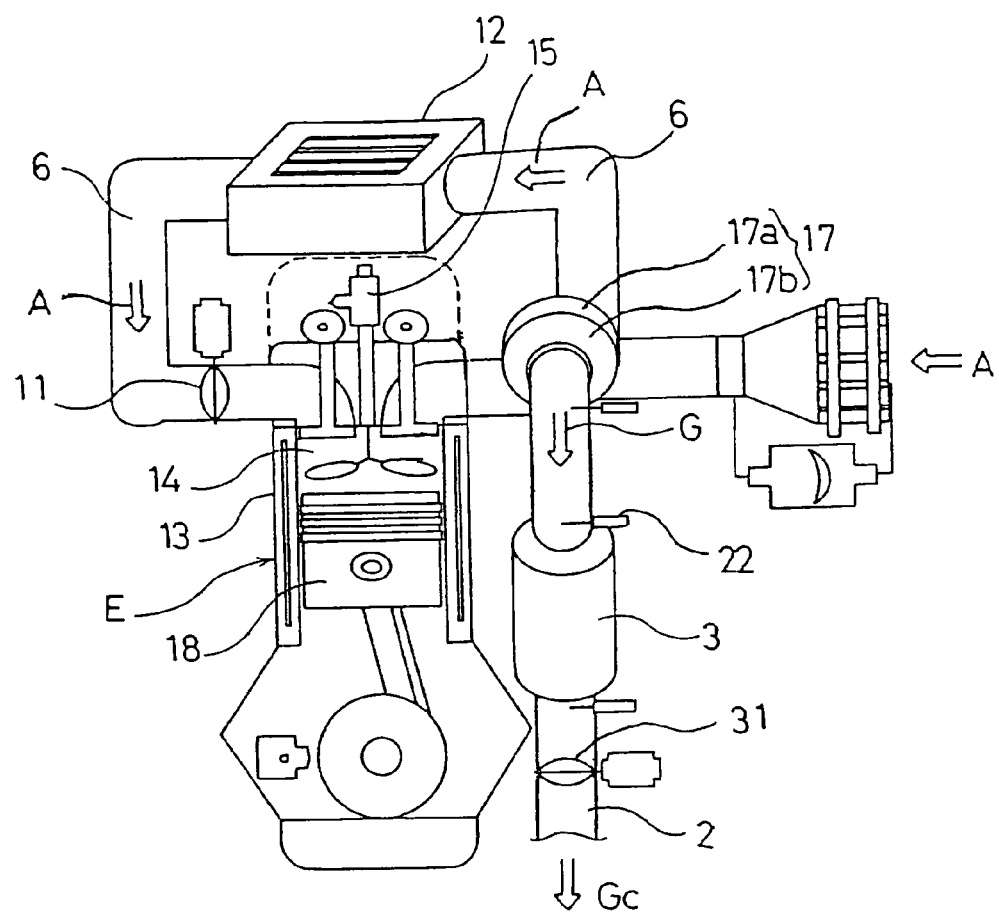
FIG. 2 is an illustration showing a configuration of the engine portion of an exhaust gas purifying system of an embodiment of the present invention.

FIGS. 1 and 2 show a configuration of an exhaust gas purifying system 1 of this embodiment. In this exhaust gas purifying system 1, a continuously regenerating type DPF 3 is set in an exhaust passage (exhaust pipe) 2 connected to an exhaust manifold of a diesel engine E. The continuously regenerating type DPF 3 is constituted of the oxidation catalyst 3Aa at the upstream side and the catalyst-provided filter 3Ab at the downstream side.

A honeycomb structure of porous ceramic and the like supports an oxidation catalyst such as platinum (Pt), which forms the oxidation catalyst 3Aa. This catalyst-provided filter 3Ab is formed by a monolith honeycomb wall flow type filter constituted by alternately sealing the inlet and outlet of a porous ceramic honeycomb channel. Catalysts such as platinum and cerium oxide are supported in this filter portion. In this catalyst-provided filter 3Ab, the PM (particulate matter) in the exhaust gas G is collected (trapped) by a porous ceramic wall.

An exhaust throttling valve (exhaust brake) 31 for performing the exhaust throttling is set to the exhaust passage 2 at the upstream side of the continuously regenerating type DPF 3. A differential pressure sensor 21 is set in a conduction pipe connected to the front and the rear of the continuously regenerating type DPF 3, to estimate the quantity of the PM accumulated on the catalyst-provided filter 3Ab. A DPF inlet exhaust gas temperature sensor 22 is set to the upstream side of the continuously regenerating type DPF 3, for regeneration control of the catalyst-provided filter 3Ab. Output values of these sensors are input to the controller (electronic control box: ECU: Engine Control Unit) 5. The controller 5 performs general control of operations of an engine E and the control of the catalyst-provided filter 3Ab.

A fuel injection valve 15, an exhaust throttling valve 31, and an intake valve 11, which is set to an intake passage 6 to adjust an air intake to an air-intake manifold, of the engine E are controlled by a control signal output from the controller 5.

The following information is input to the controller 5 to operate the engine: on/off of a PTO switch, on/off of a neutral switch, vehicle speed, cooling-water temperature, engine speed, and designated injection quantity (Q). Moreover, the fuel injection valve 15 is connected to a common rail (not illustrated) for temporarily storing high-pressure fuel boosted by a fuel pump (not illustrated).

In the above configuration, the intake air A flows into a combustion chamber 14 of a cylinder 13 after adjusting the quantity thereof is adjusted in the intake valve 11 via the compressor 17a of a turbocharger 17 and an intercooler 12 in an intake passage 6. The fuel injection valve 15 is set to the combustion chamber 14. The fuel injection from the fuel injection valve 15 causes the fuel and the intake air A to be mixed. Then, the mixed gas is spontaneously ignited and burned, due to the compression by a piston 18, and the exhaust gas G is generated. The exhaust gas G passes through the exhaust throttling valve 31 via the turbine 17b of the turbocharger 17 of the exhaust passage and enters the continuously regenerating type DPF 3. The exhaust gas G becomes purified exhaust gas Gc in the continuously regenerating type DPF 3. This exhaust gas Gc is discharged to the atmospheric air via a muffler 8.

Figure 3:
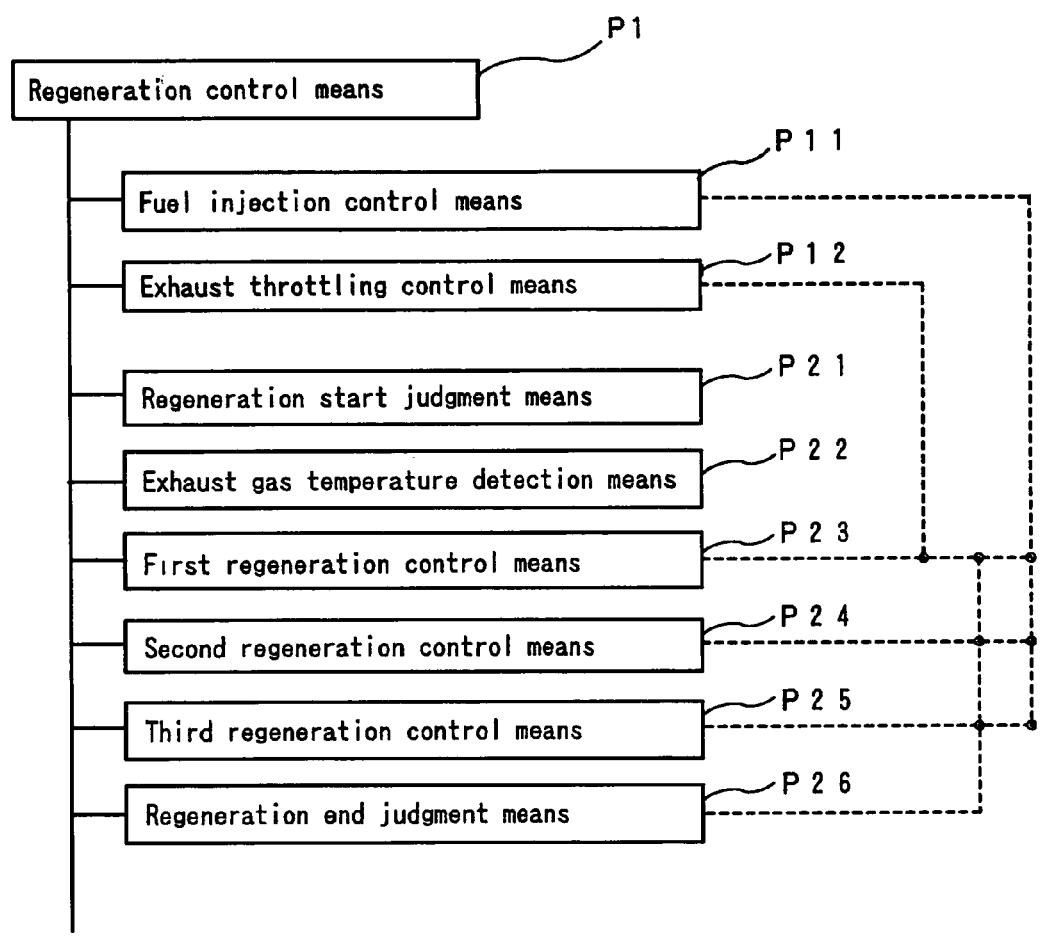
FIG. 3 is an illustration showing a configuration of regeneration control means of the present invention.

Moreover, the controller 5 provided with a regeneration control means P1 comprises of a fuel injection control means P11 and an exhaust throttling control means 12, as shown in FIG. 3, to regenerate the continuously regenerating type DPF 3. The regeneration control means P1 further comprises a regeneration start judgment means P21, an exhaust gas temperature detection means P22, a first regeneration control means P23, a second regeneration control P24, a third regeneration control P25, and regeneration end judgment means P26.

The exhaust gas temperature detection means P22 judges a region in which an exhaust gas temperature Tg exists, which is detected by the DPF inlet exhaust gas temperature sensor 22. In other words, the means P22 judges whether the exhaust gas temperature Tg is equal to a predetermined first temperature region or lower, that is, a predetermined first temperature Tg1, whether the exhaust gas temperature Tg is within a predetermined second temperature region, that is, higher than the predetermined first temperature Tg1 and equal to a predetermined second temperature Tg2 or lower, whether the exhaust gas temperature Tg is within a predetermined third temperature region, that is, higher than the predetermined second temperature Tg2 and equal to or lower than a predetermined third temperature Tg3, or whether the exhaust gas temperature Tg is within a fourth temperature region, that is, higher than the predetermined third temperature Tg3.

Though the predetermined first temperature Tg1 slightly differs, depending on an engine, this temperature is extremely low at approx. 150° C. with an oxidation catalyst at an active temperature or lower. Moreover, the predetermined second temperature Tg2 slightly differs depending on an engine, and is the low temperature of approx. 200° C. at which an oxidation catalyst becomes an active temperature or lower. The predetermined third temperature Tg3 slightly differs depending on an engine, and is the comparatively high temperature of approx. 350° C. at which an oxidation catalyst becomes an active temperature or higher.

The first temperature region Z1 is a temperature region with an extremely low exhaust gas temperature, in which it is difficult to raise the temperature of exhaust gas up to an active temperature or higher unless the oxidation catalyst 3Aa has a temperature equal to or lower than an active temperature and first regeneration control is performed. The second temperature region Z2 is a temperature region in which an exhaust gas temperature is low, the oxidation catalyst 3Aa has an active temperature or lower and it is possible to raise the temperature of exhaust gas up to the active temperature or higher through second regeneration control.

Further, the third temperature region Z3 is a temperature region, in which an exhaust gas temperature is set so that the oxidation catalyst 3a has an active temperature or lower. However, it is a temperature region, in which a DPF can be regenerated through third regeneration control by easily raising an exhaust gas temperature up to the active temperature or higher. The fourth temperature region Z4 is a temperature region, in which an exhaust gas temperature is set so that the oxidation catalyst 3Aa has an active temperature or higher, and the PM is burned and removed with no regeneration control.

Figure 6:
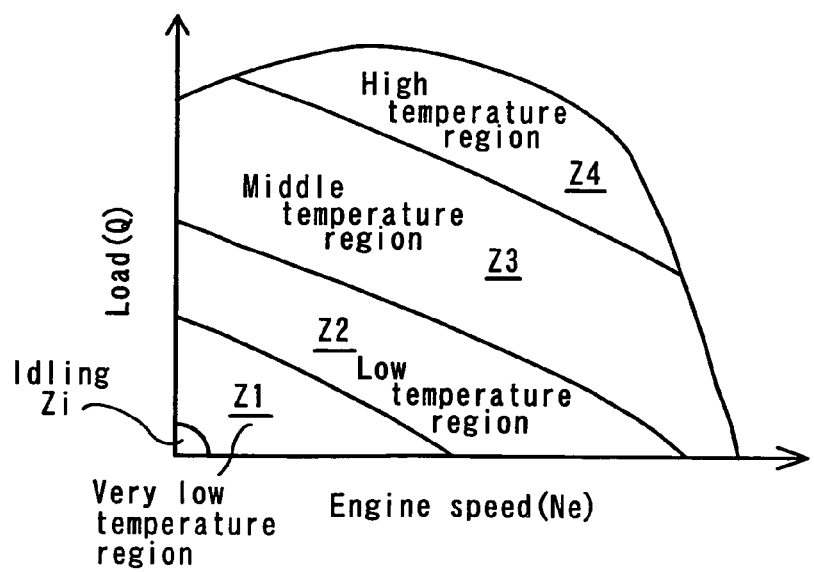
FIG. 6 is an illustration showing a relation between engine speeds, loads, and exhaust gas temperature regions.
Figure 7:
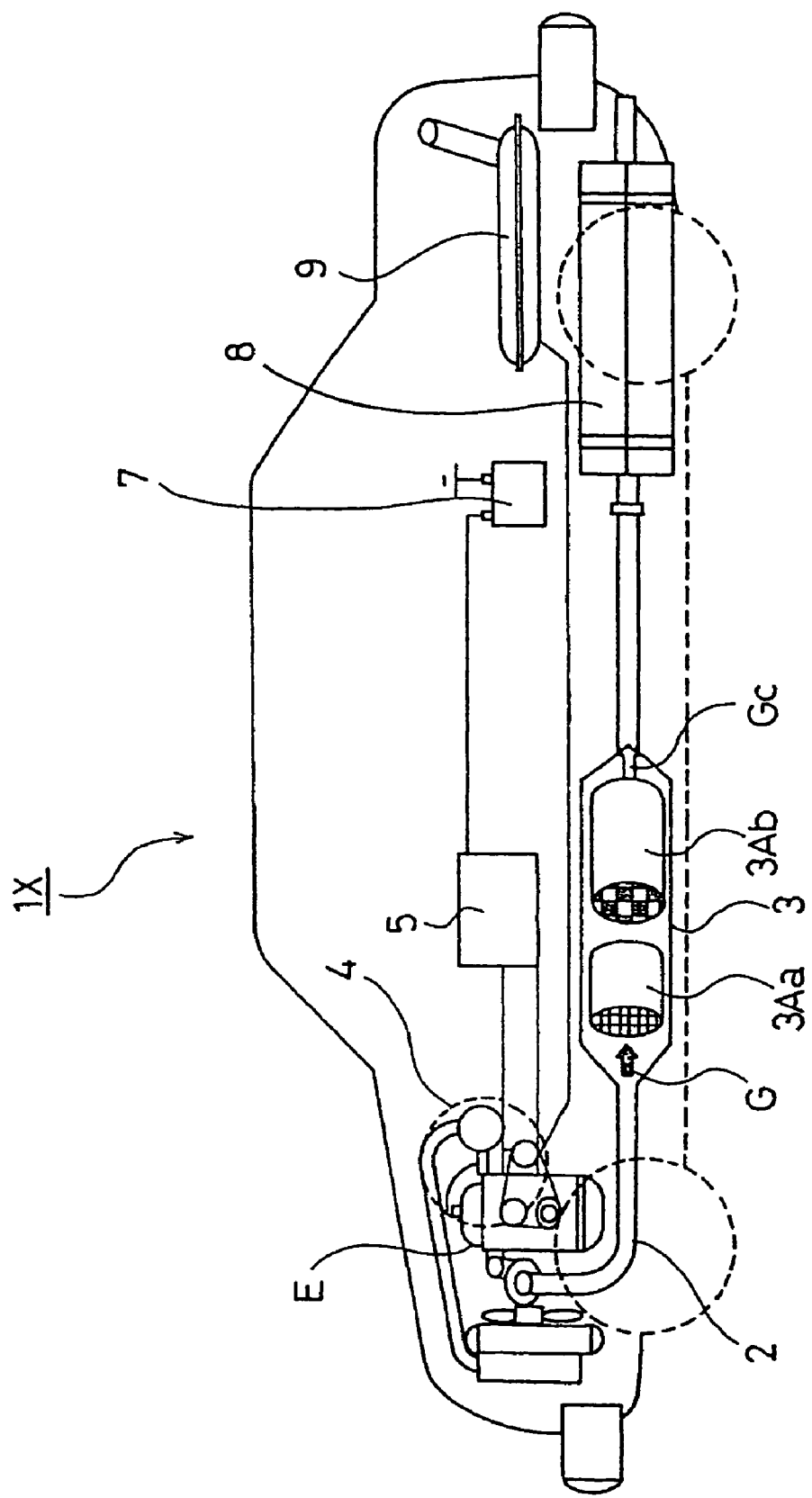
FIG. 7 is a system block diagram showing an example of an exhaust gas purifying system of the prior art.
Figure 8:
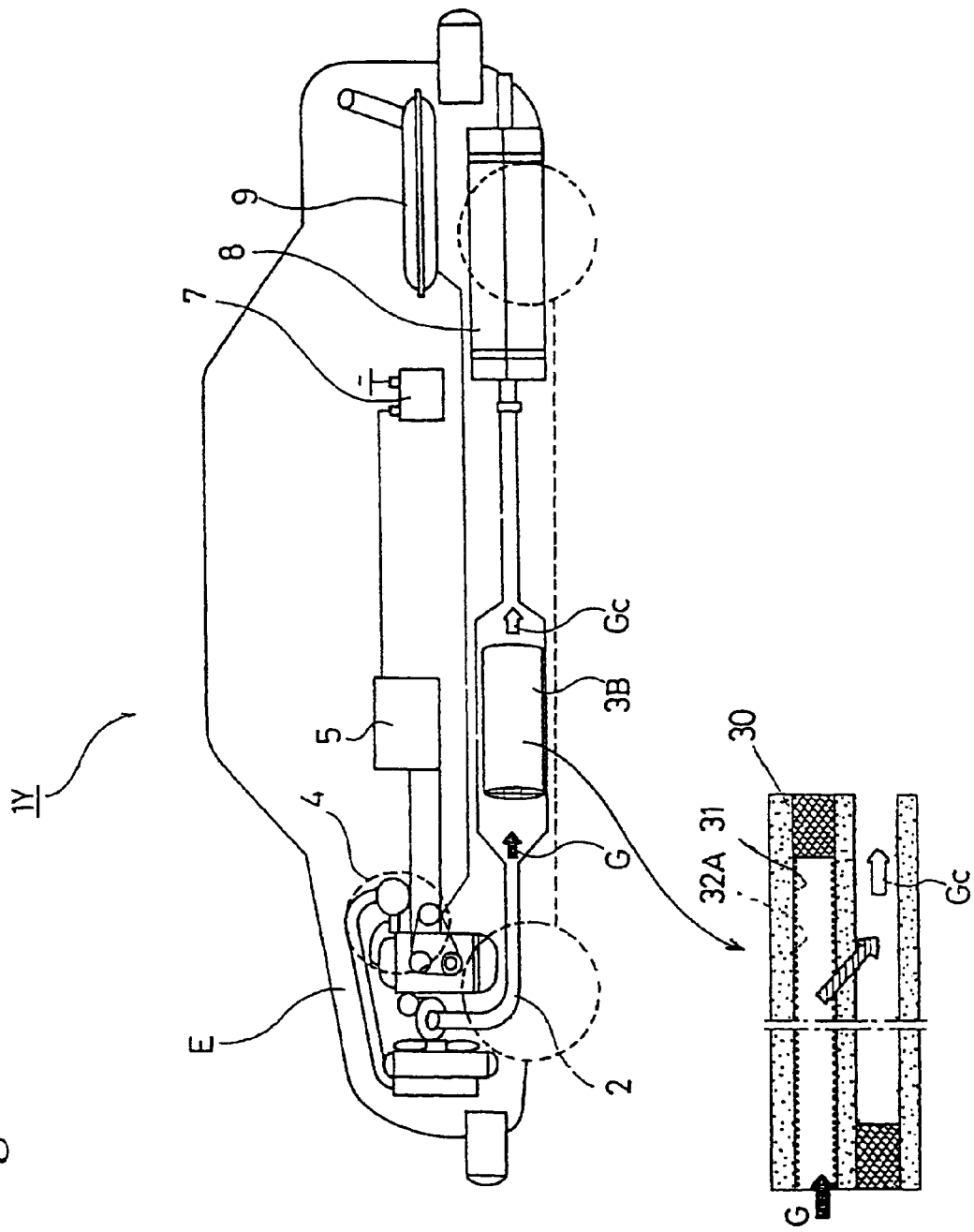
FIG. 8 is a system block diagram showing another example of the exhaust gas purifying systems of the prior art.
Figure 9:
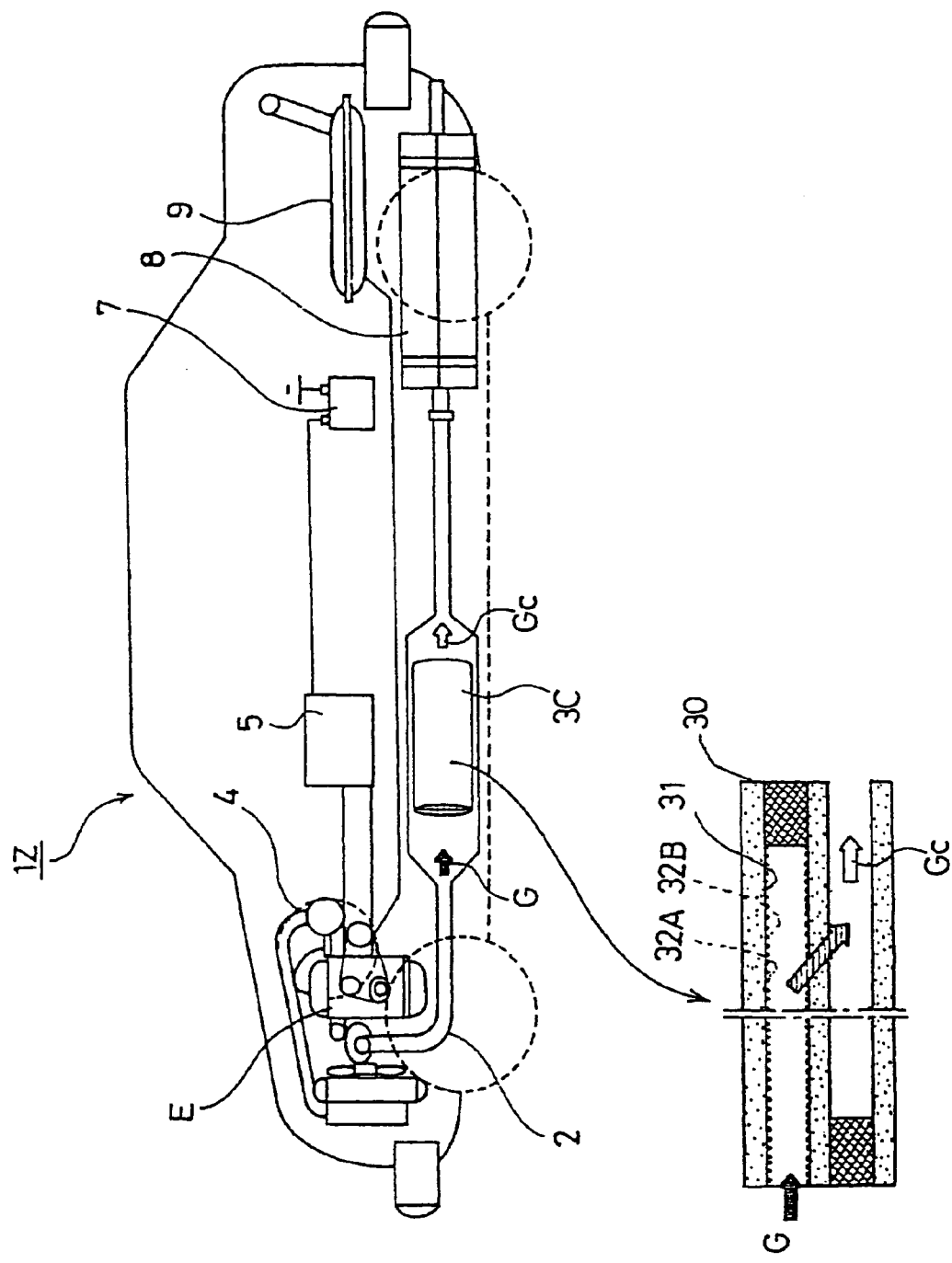
FIG. 9 is a system block diagram showing still another example of the exhaust gas purifying systems of the prior art.

Furthermore, it is allowed to constitute the exhaust gas temperature detection means P22 as described below. That is, instead of detecting the exhaust gas temperature Tg by the DPF inlet exhaust gas temperature sensor 22, a relation between engine speed Ne, load Q, and exhaust gas temperature Tg is previously examined as shown in FIG. 6. Based on the engine speed Ne and the load Q, a relation between first temperature region (very low temperature region) Z1, second temperature region (low temperature region) Z2, third temperature region (middle temperature region) Z3, and fourth temperature region (high temperature region) Z4 of the exhaust gas temperature Tg is input to the controller 5 as map data. Then, it is detected in which region of the predetermined temperature regions Z1, Z2, Z3, and Z4 the exhaust gas temperature detection means P22 is included by referring to the map data for these temperature regions, based on the engine speed Ne detected by an engine speed sensor and the load Q detected by a load sensor.

The regeneration control means P1 is constituted so that it is controlled by the exhaust gas temperature detection means P22 in the regeneration of the continuously regenerating type DPF 3 as follows. When it is detected that the exhaust gas temperature Tg is included in the predetermined first temperature region Z1, the first regeneration control means P23 performs first exhaust gas temperature raising control, by the multistage delay injection using the fuel injection control means P11 and by the exhaust throttling using the exhaust throttling control means P12. When it is detected that the exhaust gas temperature Tg is included in the predetermined second temperature region Z2, the second regeneration control means P24 performs second exhaust gas temperature raising control by the multistage delay injection using the fuel injection control means P11. Moreover, when it is detected that the exhaust gas temperature Tg is included in the predetermined third temperature region Z3, the third regeneration control means P24 performs third exhaust gas temperature raising control by post injection using the fuel injection control means P11.

Figure 4:
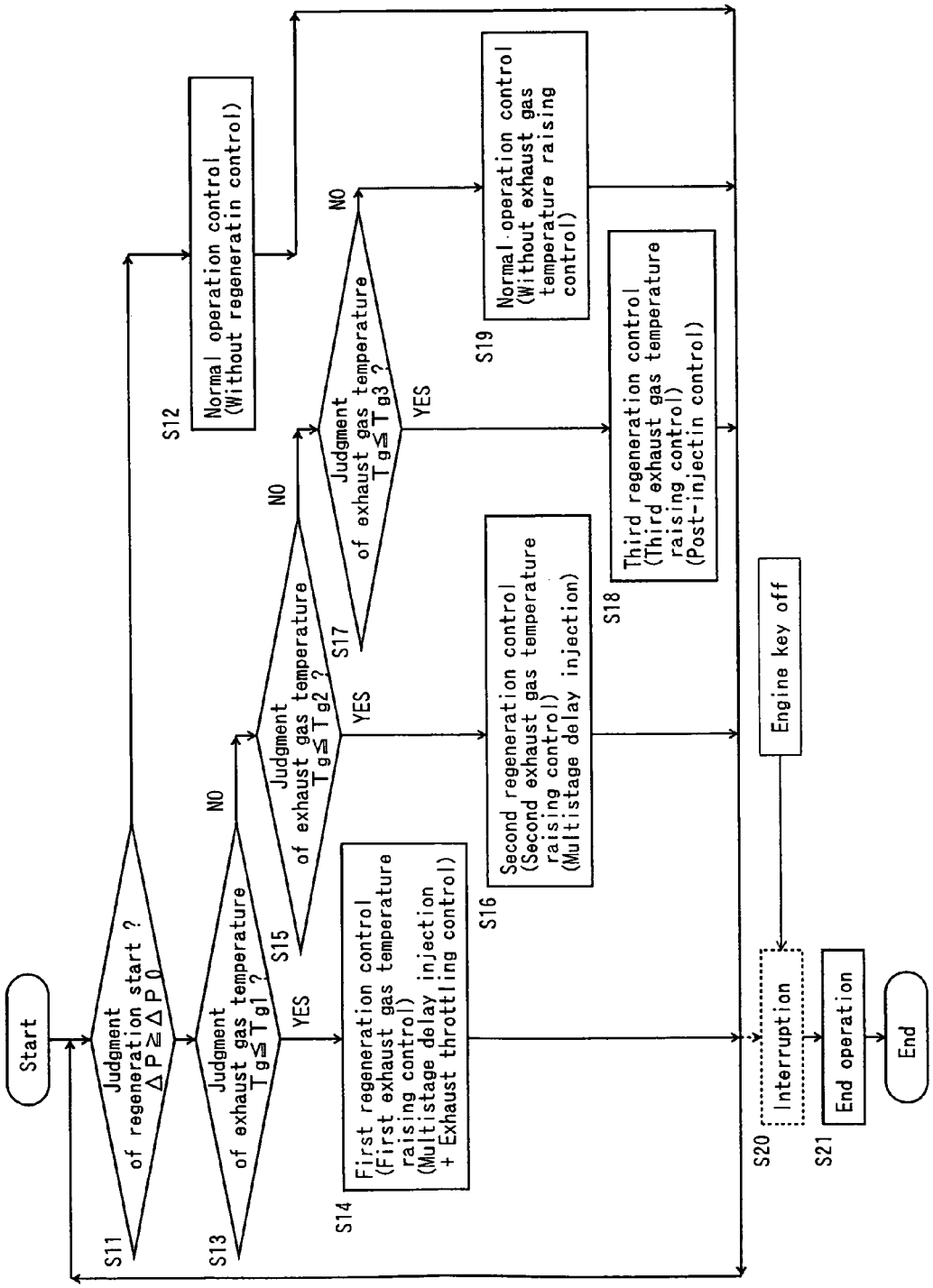
FIG. 4 is a flowchart showing a flow of regeneration control of the present invention.

The regeneration control means P1 performs regeneration control along the control flow shown in FIG. 4. First, when the regeneration control and an engine start together simultaneously, it is judged in the step S11 whether or not the regeneration is started. This judgment is performed based on whether or not the differential pressure $\Delta P$ of the differential pressure sensor 21 exceeds a predetermined judgment value $\Delta P0$. It is also allowed to perform the judgment of regeneration start by comparing the accumulated quantity of the PM obtained by accumulating the accumulated quantity of the PM, which is calculated on the basis of an operation state of an engine, with a predetermined judgment value.

When the differential pressure $\Delta P$ does not exceed the predetermined judgment value $\Delta P0$ as a result of the judgment of the regeneration start in the step S11, that is, in the case of not regeneration start, the step S12 is started. Then, the normal operation control is performed for a predetermined time (time relating to time interval for judgment of the regeneration start) and then, step S11 is restarted.

In the case of the normal operation control, the forcible fuel injection and the like for regeneration is not performed but an engine is controlled by the fuel injection depended on the required engine speed and the load, the EGR control, the intake throttling, and the exhaust throttling and the like.

Moreover, when the differential pressure $\Delta P$ becomes the predetermined judgment value $\Delta P0$ or more as a result of the judgment of the regeneration start in the step S1, that is, in the case of the regeneration start, the step S13 is started. In the step S13, an exhaust gas temperature is judged.

When the exhaust gas temperature Tg is equal to the predetermined first temperature Tg1 or lower as a result of the judgment of the exhaust gas temperature in step S13, that is, when the temperature Tg is included in the first temperature region (the very low temperature region) Z1, the step S14 is started to perform the first regeneration control. The first regeneration control performs the first exhaust gas temperature raising control for performing the intake throttling for closing the exhaust throttling valve 31 by the exhaust throttling control means P12 together with excessively delay and the multistage injection by the fuel injection control means P11. This control raises the temperature of exhaust gas so that a temperature and an environment suitable for oxidation and removal of the PM are obtained. Moreover, the control oxidizes and removes the PM collected in the continuously regenerating type DPF 3.

Figure 5:
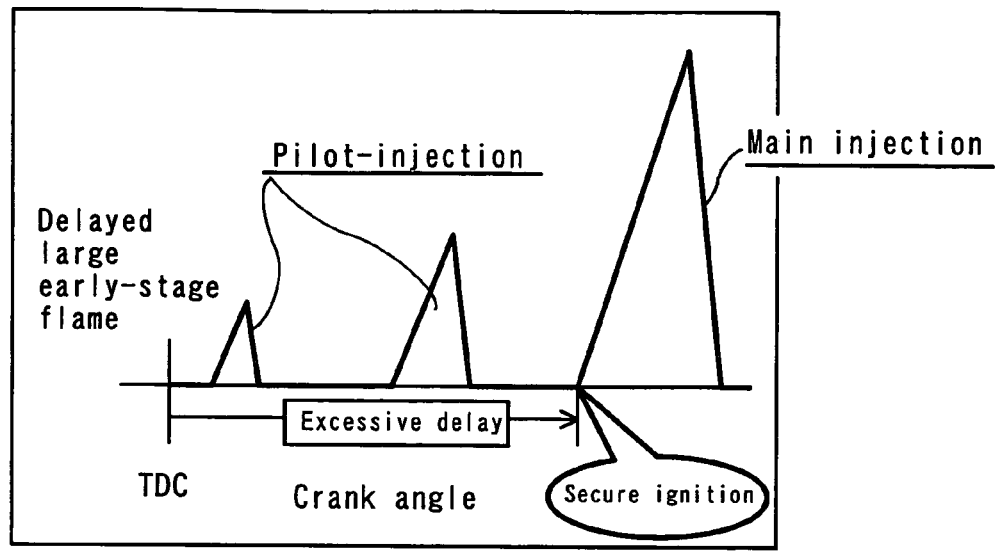
FIG. 5 is an illustration showing an example of multistage injection in regeneration control of the present invention.

The excessively delay multistage injection is the fuel injection when excessively delaying (retarding) the timing of the main injection of the fuel injection of the engine E. As shown in FIG. 5, this fuel injection is performed by the multistage injection of the pilot-injection and the main injection. By performing the multistage pilot-injection having a small injection quantity or injection period delay at the front stage of the main injection, for example, excessively delay of the main injection is realized and the multistage delay injection of twice of pilot-injection and once of main injection shown in FIG. 5 is performed. The multistage injection having more number stages is more preferable.

Then, by using the exhaust throttling together with the multistage delay injection, the pressure of the exhaust manifold at the outlet of an engine is raised. For example, when the temperature of exhaust gas is raised to 600° C. or higher in a low engine-speed region nearby an engine speed of approx. 800 rpm, the exhaust pressure is set to 70 kPa or more by using the exhaust throttling.

In the case of the first regeneration control, with using the exhaust throttling control together, the temperature of the exhaust gas is raised and HC is supplied to the exhaust passage 2 at one stage or several stages. Thereby, the PM collected in the continuously regenerating type DPF 3 is burned and removed. This control is performed by the regeneration end judgment means 26 until the end of regeneration is judged. The end of regeneration is judged depending on whether or not a predetermined time elapses or whether or not the differential pressure ΔP becomes equal to a predetermined judgment value ΔP1 or less. Moreover, when the end of regeneration is judged, the step S11 is restarted.

Then, when the exhaust gas temperature Tg is higher than the predetermined first temperature Tg1 as a result of the judgment of the exhaust gas temperature in the step S13, the exhaust gas temperature judgment is performed in the step S14. When the exhaust gas temperature Tg is equal to the predetermined second temperature Tg2 or lower and is included in the second temperature region (low temperature region) Z2 as a result of the judgment of the exhaust gas temperature region in this step S14, the step S15 is started to perform the second regeneration control.

The second regeneration control does not perform intake throttling by the exhaust throttling control means P12 but it performs the second exhaust gas temperature raising control by the fuel injection control means P11. This control performs the excessively delay multistage injection obtained by excessively delaying (retarding) the timing of the main injection of the fuel injection of the engine E. The retard value becomes smaller than the case of the first exhaust gas temperature raising control. Thereby, the temperature of the exhaust gas is raised so that a temperature and an environment suitable for oxidation and removal of the PM are realized. Thereby, the PM collected in the continuously regenerating type DPF 3 is oxidized and removed.

Moreover, when the exhaust gas temperature Tg is higher than the predetermined second temperature Tg2 as a result of the judgment of the exhaust gas temperature in this step S14, the exhaust gas temperature judgment in the step S15 is performed. When the exhaust gas temperature Tg is equal to the predetermined third temperature Tg3 or lower and is included in the third temperature region (middle temperature region) Z3 as a result of the judgment of the exhaust gas temperature region in this step S15, the step S15 is started to perform the third regeneration control.

The third regeneration control does not perform the exhaust throttling by using the exhaust throttling control means P12 but it performs the third exhaust gas temperature raising control by the fuel injection control means P11. This control performs the post-injection in the fuel injection of the engine E. By supplying the fuel into the exhaust passage 2 by using the post-injection and burning the fuel by the oxidation catalyst 3Aa, the exhaust gas temperature at the inlet of the catalyst-provided filter 3Ab is raised so that a temperature and an environment suitable for the oxidation and removal of the PM are realized. Thereby, the PM collected in the continuously regenerating type DPF 3 is oxidized and removed.

Moreover, when the exhaust gas temperature Tg is higher than the predetermined third temperature Tg3 and is included in the fourth temperature region (high temperature region) Z4 as a result of the judgment of the exhaust gas temperature in this step S15, the PM is burned and removed without performing the control for raising an exhaust gas temperature. Therefore, the normal operation control same as the case of the step S12 is performed in the step S16. In this case, the PM is burned and removed. Therefore, not regeneration start is judged as a result of the judgment of regeneration start in the step S11 and the step S16 is not started.

Furthermore, forcible combustion of the collected PM is accelerated by increasing the NOx concentration in the exhaust gas by air-system units such as the intake throttling, the EGR, and the VNT and the like in addition to these first to third exhaust gas temperature raising controls.

Furthermore, these first to third regeneration controls raise the temperature of the exhaust gas and supply HC to the exhaust passage 2 by using the first to third exhaust gas temperature raising controls at one stage or several stages to burn and remove the PM collected in the continuously regenerating type DPF 3. These controls are performed until the end of regeneration is judged by the regeneration end judgment means 26. The end of regeneration is judged depending on whether or not a predetermined time elapses or whether or not the differential pressure ΔP becomes equal to the predetermined judgment value ΔP1 or lower. Then, when the end of regeneration is judged, the step S11 is restarted.

By the control according to the control flow in FIG. 4, the step S11 is restarted by passing through any route of steps S11 to S12 and steps S11 to S19 and these operations are repeated until an interruption of the step S20 by an engine key off occurs. Moreover, the end operation such as storage of the state when the interruption occurs is performed in the step S21 due to occurrence of the interruption to complete the control flow.

In the first exhaust gas temperature raising control of the first regeneration control mentioned above, it is allowed to use a configuration in which the throttling quantity of the exhaust throttling valve 31 is fixed when the operation region of an engine is in an idling state Zi and the throttling quantity of the exhaust throttling valve 31 is made variable to perform the exhaust gas temperature raising control when the operation region of the engine is not in the idling state Zi. In this case, when the engine performs the idling operation, the throttling quantity of the exhaust throttling valve 31 is fixed to the maximum throttling quantity to realize the minimum quantity of the exhaust gas. Thereby, it is possible to extremely raise the exhaust gas temperature and lower a tail pipe outlet temperature due to reduction of the exhaust gas quantity. Therefore, it is possible to reduce the thermal influences on the circumferential environment when a vehicle stops. Moreover, in a low load operation after starting traveling of the vehicle, it is possible to increase an engine output by reducing the throttling quantity also in the regeneration control. Therefore, the vehicle can smoothly travel.

Then, the functional advantage when using the multistage delay injection control together with the exhaust throttling control is described below.

When using the multistage delay injection together with the exhaust throttling control, an emission of the exhaust gas in the exhaust stroke of an engine is suddenly decreased and an exhaust efficiency is greatly decreased. Therefore, in the next intake-air stroke, the exhaust gas quantity remaining inside a cylinder extremely increases. Moreover, because a fuel injection period is delayed on one hand, the temperature of the exhaust gas rises to a certain extent. Therefore, a large quantity of the exhaust gas remains at a high temperature in the intake-air stroke.

Moreover, the temperature inside the cylinder becomes higher in the next compression stroke and combustion stroke. In this case, when performing the first-stage pilot-injection, a high temperature is realized even through the delay injection remarkably delayed. Therefore, it is possible to obtain the secure ignition and shift to the securer combustion. It is possible to keep a high temperature inside the cylinder by the secure combustion even in the middle of an expansion stroke. Because the delay injection is performed in the middle of the expansion stroke, increasing the injected fuel quantity does not influence occurrence of torque. Therefore, it is possible to increase a injected fuel quantity compared to the case of not using an exhaust throttling, an early-stage injection quantity can be increased. Therefore, it is possible to make an early-stage flame larger at an extremely low load.

The second-stage pilot-injection in which an injection quantity is further increased is performed when the combustion of the fuel injected at the first stage is activated. Though the fuel at the second-stage injection is a period in which a piston at the later stage of the expansion stroke is further lowered, ignition occurs and heat is generated by the first-stage stable flame even in a low pressure state. Therefore, it is possible to make the flame larger inside the cylinder and the temperature inside the cylinder further rises. However, this combustion does not contribute to occurrence of the torque but it contributes to a rise of the temperature of the exhaust gas.

Then, the third-stage main injection is performed when the combustion of the fuel of the second-stage injection is activated. The third-stage injection generates a secure main combustion flame by increasing the injection quantity further and performing the large main injection of a combustion flame. Thereby, a flame can be propagated up to a lean mixture, it is possible to prevent white smoke and misfire from generating. Therefore, it is possible to efficiently greatly raise an exhaust gas temperature. The main injection fuel burned nearby the period in which the exhaust valve opens extremely contributes to a rise of the exhaust gas temperature but it does not contribute to occurrence of a torque.

In this case, the inlet temperature of the oxidation catalyst 3Aa of the continuously regenerating type DPF 3 stepwise rises as the fuel injection is stepwise performed.

Moreover, when performing post injection after the main injection, even for the post injection, it is possible to enlarge the misfire limit and perform combustion in a great delay state by using exhaust throttling together. Therefore, it is possible to efficiently raise an exhaust gas temperature without increasing torque.

Furthermore, by controlling a load and engine speed based on the final injected fuel quantity, efficient raise of the exhaust gas temperature and smooth control of the engine can be realized.

Thus, the exhaust gas temperature is raised in accordance with the increase of the load and the injected fuel quantity by using the exhaust throttling together. Moreover, because the tail pipe exit temperature is lowered due to reduction of the exhaust gas quantity, it is possible to cope with to a thermal harm.

According to the exhaust gas purifying system 1 having the above configuration, it is possible to perform the following control when the differential pressure of the differential pressure sensor 21 rises and exceeds a set value and the quantity of PM accumulated in the catalyst-provided filter 3Ab of the continuously regenerating type DPF 3 must be regenerated.

When the exhaust gas temperature Tg is equal to or lower than the predetermined first temperature Tg1, that is, when the exhaust gas temperature Tg is very low like the case of the first temperature region Z1 in which an engine is operated at a low load and low engine speed such as the case of idling, it is possible to perform the first regeneration control in accordance with multistage delay injection using exhaust throttling together. Moreover, in the case of the second temperature region Z2 in which the engine operation condition does not easily reach the exhaust gas temperature necessary for the oxidation of PM and the regeneration of the DPF, it is possible to perform the second regeneration control in accordance with the multistage delay injection not using the exhaust throttling control together. Furthermore, in the case of the third temperature region Z3 in which the engine operation condition can easily reach the exhaust gas temperature necessary for the oxidation of PM and the regeneration of the DPF, it is possible to perform the third regeneration control in accordance with the multistage delay injection not using the exhaust throttling control together.

Therefore, even when the exhaust gas temperature Tg is very low at the time of the low load and the low engine speed such as the idling operation, the exhaust gas remaining in the intake stroke can be increased in the quantity and raised in the temperature in accordance with the raise of the engine exhaust pressure by performing the exhaust throttling together with the multistage delay injection. Thereby, it is possible to improve the ignitability and the combustion performance of injection fuel. Accordingly, it is possible to efficiently raise the temperature of the exhaust gas and forcibly regenerate PM.

Moreover, because the first regeneration control using the exhaust throttling together and the second regeneration control not using the exhaust throttling together are separately used depending on whether or not the exhaust gas temperature Tg exceeds the predetermined first temperature Tg1, it is possible to reduce an exhaust pressure rise period and prevent fuel consumption from deteriorating. Furthermore, because the multistage delay injection control and the post injection control are separately used depending on whether or not the exhaust gas temperature Tg exceeds the predetermined second temperature Tg2, it is possible to prevent fuel consumption from deteriorating.

The continuously regenerating type DPF 3 having the filter 3Ab made to support a catalyst and the oxidation catalyst 3Aa on the catalyst-provided filter 3Ab is described above as the example. However, the present invention can be also applied to a DPF which is not the continuously regenerating type using only a filter, a continuously regenerating type DPF making a filter support a catalyst, and a continuously regenerating type DPF having an oxidation catalyst at the upstream side of a filter in addition to the continuously regenerating type DPF 3.

What is claimed is:

1. An exhaust-gas purifying system comprising:
an exhaust-throttling valve and a diesel particulate filter set in an exhaust passage; and
regeneration control means for regenerating the diesel particulate filter;
said regeneration control means being provided with an exhaust-gas temperature detector, a fuel injection control unit and an exhaust-throttling control unit;
wherein regenerating of the diesel particulate filter is performed in a manner such that when it is detected by the exhaust-gas temperature detector that the exhaust-gas temperature is in a predetermined first temperature region, said regeneration control means carries out an exhaust-gas temperature raising control by a multistage delay fuel-injection through the fuel injection control unit and by an exhaust throttling through the exhaust-throttling control unit;
while when it is detected by the exhaust-gas temperature detector means that the exhaust-gas temperature is in a predetermined second temperature region in which the exhaust-gas temperature is higher than in the predetermined first temperature region, said regeneration control means carries out an exhaust-gas temperature raising control by a multistage delay fuel-injection through the fuel injection control unit without carrying out an exhaust throttling.

2. The exhaust gas purifying system according to claim 1, wherein the exhaust gas temperature detector refers to a preset map data in the predetermined temperature region divided on the basis of a relation between an engine speed and a load in accordance with the engine speed and the load, and detects whether the exhaust gas temperature is in a predetermined temperature region.

3. An exhaust-gas purifying system comprising:

an exhaust-throttling valve and a diesel particulate filter set in an exhaust passage; and regeneration control means for regenerating the diesel particulate filter;

said regeneration control means being provided with an exhaust-gas temperature detector, a fuel injection control unit and an exhaust-throttling control unit;

wherein in regenerating the diesel particulate filter, said regeneration control means carries out an exhaust-gas temperature raising control by a multistage delay fuel-injection through the fuel injection control unit and by an exhaust throttling through the exhaust-throttling control unit, and wherein the exhaust-gas temperature raising control is carried out with the throttling quantity of the exhaust-throttling valve fixed when the engine operation region is in an idling state, while the throttling quantity of the exhaust-throttling valve is set variable when the engine operation region is not in an idling state.

4. An exhaust-gas purifying method comprising:

detecting an exhaust-gas temperature;

regenerating a diesel particulate filter when the detected exhaust gas temperature is in a first temperature region by carrying out an exhaust-gas temperature raising control by a multistage delay fuel-injection and by an exhaust throttling of an exhaust throttling valve; and regenerating the particulate diesel filter when it is detected that the exhaust gas temperature is in a second temperature region in which the exhaust gas temperature is higher than in the first temperature region, by carrying out an exhaust gas temperature raising control by a multistage delay fuel-injection without carrying out an exhaust throttling of the exhaust throttling valve.

* * * * *